United States Patent
Ng et al.

(10) Patent No.: US 8,838,114 B2
(45) Date of Patent: Sep. 16, 2014

(54) METHOD AND APPARATUS FOR EFFICIENT SERVING CELL CHANGE USING MULTIPLE PARALLEL TIMERS

(75) Inventors: Alvin S. Ng, San Diego, CA (US); Chunchung Chan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 81 days.

(21) Appl. No.: 13/511,953

(22) PCT Filed: Dec. 28, 2009

(86) PCT No.: PCT/CN2009/076107
§ 371 (c)(1),
(2), (4) Date: May 24, 2012

(87) PCT Pub. No.: WO2011/079425
PCT Pub. Date: Jul. 7, 2011

(65) Prior Publication Data
US 2012/0276911 A1    Nov. 1, 2012

(51) Int. Cl.
*H04W 36/00* (2009.01)
*H04W 36/18* (2009.01)
*H04W 36/30* (2009.01)

(52) U.S. Cl.
CPC ........... *H04W 36/18* (2013.01); *H04W 36/30* (2013.01)
USPC ............ 455/438; 455/436; 455/439; 370/331

(58) Field of Classification Search
CPC .................................................... H04W 80/04
USPC ........................... 455/436, 439, 442; 370/331
See application file for complete search history.

(56) References Cited

U.S. PATENT DOCUMENTS

| | | | |
|---|---|---|---|
| 2003/0095516 A1* | 5/2003 | Ok et al. | 370/331 |
| 2007/0173254 A1* | 7/2007 | Tebbit et al. | 455/434 |
| 2008/0311910 A1 | 12/2008 | Ishii et al. | |
| 2009/0075666 A1* | 3/2009 | Makhijani et al. | 455/450 |
| 2010/0029274 A1* | 2/2010 | Deshpande et al. | 455/435.3 |
| 2010/0234030 A1* | 9/2010 | De Pasquale et al. | 455/442 |
| 2010/0279682 A1* | 11/2010 | Rangaiah et al. | 455/426.1 |
| 2011/0026492 A1* | 2/2011 | Frenger et al. | 370/331 |

FOREIGN PATENT DOCUMENTS

| | | |
|---|---|---|
| CN | 101272588 A | 9/2008 |
| JP | 2008028682 A | 2/2008 |
| WO | 2007087636 | 8/2007 |
| WO | 2009117667 A1 | 9/2009 |
| WO | 2009119565 | 10/2009 |

OTHER PUBLICATIONS

International Search Report and Written Opinion—PCT/CN2009/076107—ISA/CN—Oct. 21, 2010.
"Radio Resource Control (RRC); Protocol Specification(Release 9)", 3GPP TS 25.331 V9.0.0, Sep. 30, 2009, pp. 40, 1578, 1579, 1591-1593, URL, http://www.3gpp.org/ftp/Specs/archive/25_series/25.331/25331-900.zip.

* cited by examiner

*Primary Examiner* — Danh Le
(74) *Attorney, Agent, or Firm* — Abdollah Katbab

(57) ABSTRACT

Methods and apparatus are described herein to manage a serving cell change. Timers are used to monitor one or more cells which become stronger relative to a cell which is currently the best cell. These one or more cells may be referred to as pending best cells. Further, in some aspects, additional timers can be started for any cell relative to any pending best cell when the respective cell becomes stronger than the respective pending best cell.

28 Claims, 7 Drawing Sheets

METHOD AND APPARATUS FOR EFFICIENT SERVING CELL CHANGE USING MULTIPLE PARALLEL TIMERS

BACKGROUND

1. Field

This application relates generally to wireless communications, and more particularly to handling handovers during a wireless communication session.

2. Background

In contrast with other handover mechanisms, such as those used by WCDMA R99, HSPDA and other similar technologies allow for only a single radio link (one sector) for downlink data transmission. This serving sector or cell, which transmits HSDPA to data to the mobile handset is referred to as the HS serving cell. The HS serving cell needs to be tracked by both the network and the mobile handset. Typically, the method to do so is through event 1d (e1d) reporting.

When the mobile equipment establishes an HS call, the sector or cell that sets up the call will become the first "Best Cell", and it will be reported to the mobile handset through an e1d measurement report message (MRM). When the mobile handset moves to another cell or sector, soft handover occurs and the mobile will add the new cell into its Active Set. The mobile handset will compare both cells in terms of strength and then report to the network if the new cell is stronger through an e1d MRM. The network may then send a reconfiguration message to change the HS serving cell to the new cell.

In conventional e1d handling, when an active set cell other than the best cell satisfies an e1d triggering condition, a timer is started for that cell. If the condition has been satisfied for a time period longer than the timer, the handset then set this cell as the best cell and sends an e1d measurement report. All timers are then reset. There may be other fast rising pilots that are becoming even stronger than this new best cell before the expiry of its timer. However, in the conventional handling, there is no mechanism to record when the new fast rising pilot becomes stronger than the new best cell. Accordingly, the strongest new fast rising pilot will have to wait another timer period to be reported.

It would be desirable to have a system and method for tracking such fast rising pilots.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects of the disclosure, a method for managing serving cell changes in a communications system comprises maintaining an active set of pilot cells for receiving downlink data, the active set comprising a plurality of cells for soft handover, wherein the plurality of cells comprises an initial best cell; starting a first timer to monitor a first cell from the active set of pilot cells upon the first cell becoming stronger than the initial best cell, wherein the first timer corresponds to a first monitoring period for the first cell to be stronger than the initial best cell; starting a second timer to monitor a second cell with respect to the initial best cell upon the second cell becoming stronger than the initial best cell, wherein the second timer corresponds to a second monitoring period for the second cell to be stronger than the initial best cell; upon expiration of the first timer, designating the first cell as a new best cell if the first cell was stronger than the initial best cell for the first monitoring period; and upon expiration of the second timer, designating the second cell as the new best cell if the second cell was stronger than the initial best cell for the second monitoring period and the first cell was not stronger than the initial best cell for the first monitoring period.

According to some aspects of the disclosure, at least one processor configured to manage serving cell changes in a communications system comprises a first module for maintaining an active set of pilot cells for receiving downlink data, the active set comprising a plurality of cells for soft handover, wherein the plurality of cells comprises an initial best cell; a second module for starting a first timer to monitor a first cell from the active set of pilot cells upon the first cell becoming stronger than the initial best cell, wherein the first timer corresponds to a first monitoring period for the first cell to be stronger than the initial best cell; a third module for starting a second timer to monitor a second cell with respect to the initial best cell upon the second cell becoming stronger than the initial best cell, wherein the second timer corresponds to a second monitoring period for the second cell to be stronger than the initial best cell; a fourth module for, upon expiration of the first timer, designating the first cell as a new best cell if the first cell was stronger than the initial best cell for the first monitoring period; and a fifth module for, upon expiration of the second timer, designating the second cell as the new best cell if the second cell was stronger than the initial best cell for the second monitoring period and the first cell was not stronger than the initial best cell for the first monitoring period.

According to some aspects, a computer program product comprises a computer-readable medium which comprises a first set of codes for causing a computer to maintain an active set of pilot cells for receiving downlink data, the active set comprising a plurality of cells for soft handover, wherein the plurality of cells comprises an initial best cell; a second set of codes for causing the computer to start a first timer to monitor a first cell from the active set of pilot cells upon the first cell becoming stronger than the initial best cell, wherein the first timer corresponds to a first monitoring period for the first cell to be stronger than the initial best cell; a third set of codes for causing the computer to start a second timer to monitor a second cell with respect to the initial best cell upon the second cell becoming stronger than the initial best cell, wherein the second timer corresponds to a second monitoring period for the second cell to be stronger than the initial best cell; a fourth set of codes for causing the computer to, upon expiration of the first timer, designate the first cell as a new best cell if the first cell was stronger than the initial best cell for the first monitoring period; and a fifth set of codes for causing the computer to, upon expiration of the second timer, designate the second cell as the new best cell if the second cell was stronger than the initial best cell for the second monitoring period and the first cell was not stronger than the initial best cell for the first monitoring period.

According to some aspects, an apparatus comprises means for maintaining an active set of pilot cells for receiving downlink data, the active set comprising a plurality of cells for soft handover, wherein the plurality of cells comprises an initial best cell; means for starting a first timer to monitor a first cell from the active set of pilot cells upon the first cell becoming stronger than the initial best cell, wherein the first timer corresponds to a first monitoring period for the first cell to be stronger than the initial best cell; means for starting a second timer to monitor a second cell with respect to the initial best cell upon the second cell becoming stronger than the initial best cell, wherein the second timer corresponds to a second monitoring period for the second cell to be stronger than the initial best cell; means for, upon expiration of the first timer, designating the first cell as a new best cell if the first cell was stronger than the initial best cell for the first monitoring period; and means for, upon expiration of the second timer, designating the second cell as the new best cell if the second cell was stronger than the initial best cell for the second monitoring period and the first cell was not stronger than the initial best cell for the first monitoring period.

According to some aspects, an apparatus comprises an active set processing module configured to maintain an active set of pilot cells, the active set comprising a plurality of cells for soft handover; and a best cell selection module configured for: starting a first timer to monitor a first cell from the active set of pilot cells upon the first cell becoming stronger than the initial best cell, wherein the first timer corresponds to a first monitoring period for the first cell to be stronger than the initial best cell; starting a second timer to monitor a second cell with respect to the initial best cell upon the second cell becoming stronger than the initial best cell, wherein the second timer corresponds to a second monitoring period for the second cell to be stronger than the initial best cell; upon expiration of the first timer, designating the first cell as a new best cell if the first cell was stronger than the initial best cell for the first monitoring period; and upon expiration of the second timer, designating the second cell as the new best cell if the second cell was stronger than the initial best cell for the second monitoring period and the first cell was not stronger than the initial best cell for the first monitoring period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avid obscuring such concepts.

Several aspects of communications systems will now be presented with reference to various apparatus and methods. More particularly, a communications system will be described wherein the process of handling serving cell changes is enhanced. Multiple timers are used to monitor cells that may potentially become the best cell. Not only are cells monitored with respect to a current serving cell, but also with respect to each other. That is, if two cells become stronger than the current serving cell, a timer can be set to monitor these cells with respect to each other. Accordingly, a fast rising cell may become the new best cell without waiting a full timer period after another rising cell has become the best cell.

These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
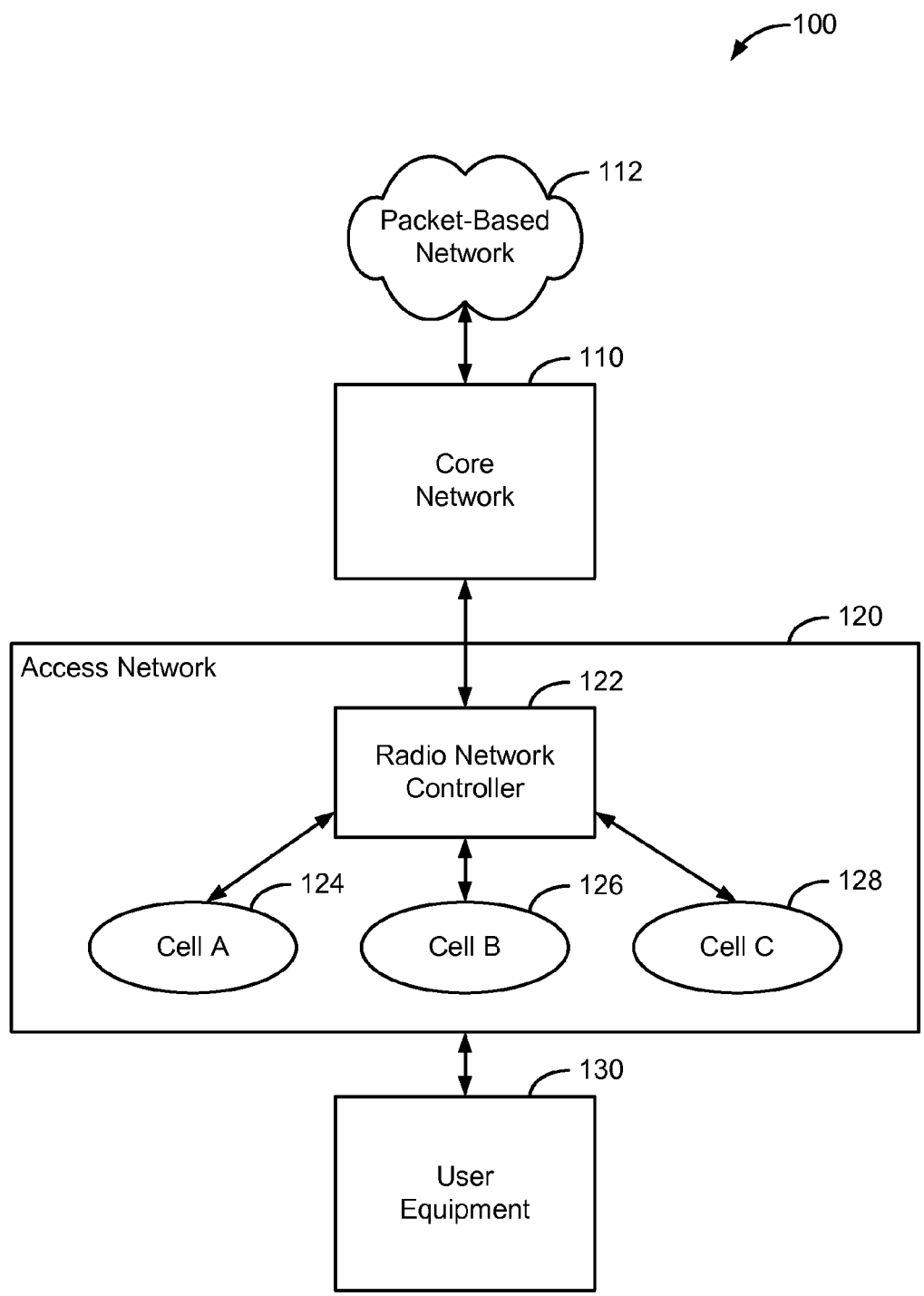
FIG. 1 depicts an exemplary network architecture, in accordance with various described aspects.

An example of a communications system employing various apparatus will now be presented with reference to a network architecture 100 as shown in FIG. 1. As those skilled in the art will readily appreciate from the detailed description to follow, the various concepts presented herein are well suited for High-Speed Downlink Packet Access (HSDPA) applications. However, these concepts may be readily extended to other communications standards. By way of example, these concepts may be extended to Long Term Evolution (LTE), Evolution-Data Optimized (EV-DO), Ultra Mobile Broadband (UMB), and/or other communications standards. The concepts may also be extended to inter-system measurements (GSM cells) for 3G to 2G cell reselection.

The apparatus and methods described herein may also be applied to WCDMA R99 Idle Mode Cell Reselection. In idle mode, the mobile handset keeps a neighbor cell list, which includes a set of cells for measurement against the current serving cell. In convention WCDMA R99 Idle Mode Cell Reselection processing, a timer may be cell for a new best cell, which is called a Treselection timer, as specified in 3GPP TS25.331, the contents of which is incorporated herein by reference. In accordance with exemplary aspects described herein, more than one Treselection timer may be generated to compare the cells in the neighbor cell list. Providing more than one Treslection timer increases the speed of cell reselection so that a mobile handset can camp onto the proper strong cell while fulfilling the signal strength/quality requirement and timer requirement. For example, in a WCDMA R99 implementation, the maximum number of cells may be set to 31 such that all possible intra-frequency cells can be accommodated. The maximum number of timers may be limited, and may vary in order to conserve processing and memory resources.

The network architecture 100 depicted in FIG. 1 is shown with a core network 110 and an access network 120. The core network 110 may provide packet-switched services to the access network 120. For example, core network 110 may provide a connection for access network 120 to a packet-based network 112, such as the Internet. However, as those of skill in the art will readily appreciate, the various concepts presented throughout this disclosure may be extended to core networks providing access to other types of packet-based networks as well as to circuit-switched network services.

Access network 120 may serve as an access point to the core network 110 for a mobile apparatus 130. Examples of a mobile apparatus include a cellular phone, a smart phone, a session initial protocol (SIP) phone, a laptop, a personal digital assistant (PDA), a satellite radio, a global positioning system, a multimedia device, a video device, a digital audio player (e.g., MP3 player, a camera), a game console, or any other similar functioning device. The mobile apparatus 130 is commonly referred to as a user equipment (UE) in applications such as HSDPA and LTE, but may also be referred to by those skilled in the art as a mobile station, a subscriber station, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Access network 120 may include a Radio Network Controller (RNC) 122 linked to a plurality of cells. Three cells, designated by reference numerals 124, 126, and 128 are shown in FIG. 1. Each of cells 124, 126, and 128 may be covered by one or separate Node Bs (not shown). The Node Bs may be terrestrial base stations capable of communicating with UE 130 wirelessly. Cells 124, 126, and 128 may be called sectors of a serving Node B, for example, where the cells are served by a single Node B.

UE 130 may establish initial communications via one of the plurality cells, which is know as the serving cell. For example, if UE 130 has established a communication session through cell 124, then cell 124 would be known as the serving cell.

UE 130 may maintain an active set (ASET) of cells. The active set includes pilot signal strength and/or other information related to cells in addition to the serving cell. The other cells in the active set may become the candidates for the serving cell if the signal pilot strength exceeds that of the serving cell. For example, as UE 130 moves to a different coverage area, such as the coverage area provided by cells 126 or 128, the pilot signal strength from one or these cells may exceed that of the current serving cell—cell 124. The ASET is typically limited to a particular number of cells such as, for example, 3 cells. As such, UE 130 may also maintain a monitored set for monitoring additional neighboring cells.

In a communication system such as HSPDA, the serving cell is tracked by both the network and the mobile. That is, both UE 130 and access network 120 track the serving cell. Typically, event 1d ("e1d") reporting is used to track the serving cell using e1d measurement reports (MRMs). In the conventional e1d handling process, in accordance with 3GPP specifications, an e1d triggering condition may be defined by the following equations:

$$10 \cdot \text{Log } M_{NotBest} + CIO_{NotBest} \leq 10 \cdot \text{Log } M_{Best} + CIO_{Best} - H_{1d}/2, \quad \text{Equation 1:}$$

$$10 \cdot \text{Log } M_{NotBest} + CIO_{NotBest} \geq 10 \cdot \text{Log } M_{Best} + CIO_{Best} + H_{1d}/2, \quad \text{Equation 2:}$$

In the above equations, $M_{NotBest}$ refers to a measurement result of a cell not the current best cell, $CIO_{NotBest}$ refers to a cell individual offset of a cell not the current best cell, $M_{Best}$ refers to a measurement result of the current best cell, $CIO_{Best}$ refers to a cell individual offset of the best cell and $H_{1d}$ refers to a hysteresis parameter for the event 1d. "Not Best" cell is deemed stronger than "Best Cell" when the trigger condition is met. When an ASET cell other than the best cell satisfies the e1d trigger condition, a $TTT_{1d}$ timer for the cell is enabled. If the trigger condition is satisfied for a time period being tracked by the $TTT_{1d}$ timer, the UE sets this cell as the best call and sends an e1d MRM to the network. All e1d evaluation timers are then reset.

Figure 2:
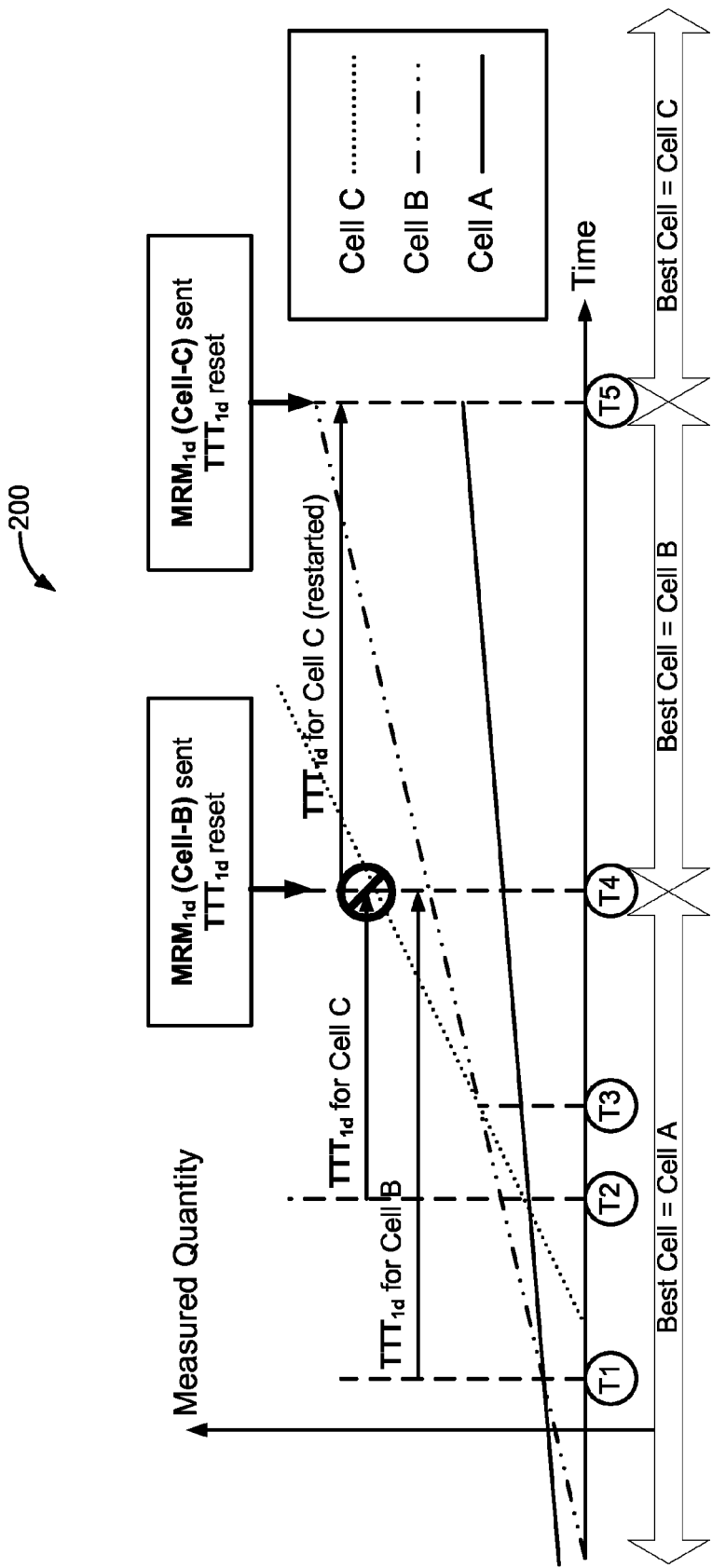
FIG. 2 depicts a timing diagram for a conventional serving cell handling process.

FIG. 2 depicts a timing diagram 200 for a conventional e1d handling process. Initially, Cell A has been defined as the best cell. At time T1, Cell B rises and becomes stronger than Cell A. Thus, a timer $TTT_{1d}(B)$ for Cell B is started. This timer may be set to a predetermined timer value, and may be used to detect how long a cell remains stronger than the best cell by some hysteresis value. At time T2, a timer $TTT_{1d}(C)$ for Cell C is started when Cell C becomes stronger than Cell A but less than Cell B. At time T2, before the expiry of timer $TTT_{1d}(B)$, Cell C has become stronger than both Cell A and Cell B. At time T4, as Cell B continues to be stronger than Cell A, the timer $TTT_{1d}(B)$ expires and an e1d MRM for Cell B is sent to the network. Both timers $TTT_{1d}(B)$ and $TTT_{1d}(C)$ are then reset. At time T5, the newly reset timer $TTT_{1d}(C)$ expires, Cell C becomes the best cell, and an e1d MRM for Cell C is sent to the network. As depicted in FIG. 2, there is a delay in selecting fast rising pilot Cell C as the best cell because the e1d MRM for Cell B resets the timer $TTT_{1d}(C)$ at time T4.

Figure 3:
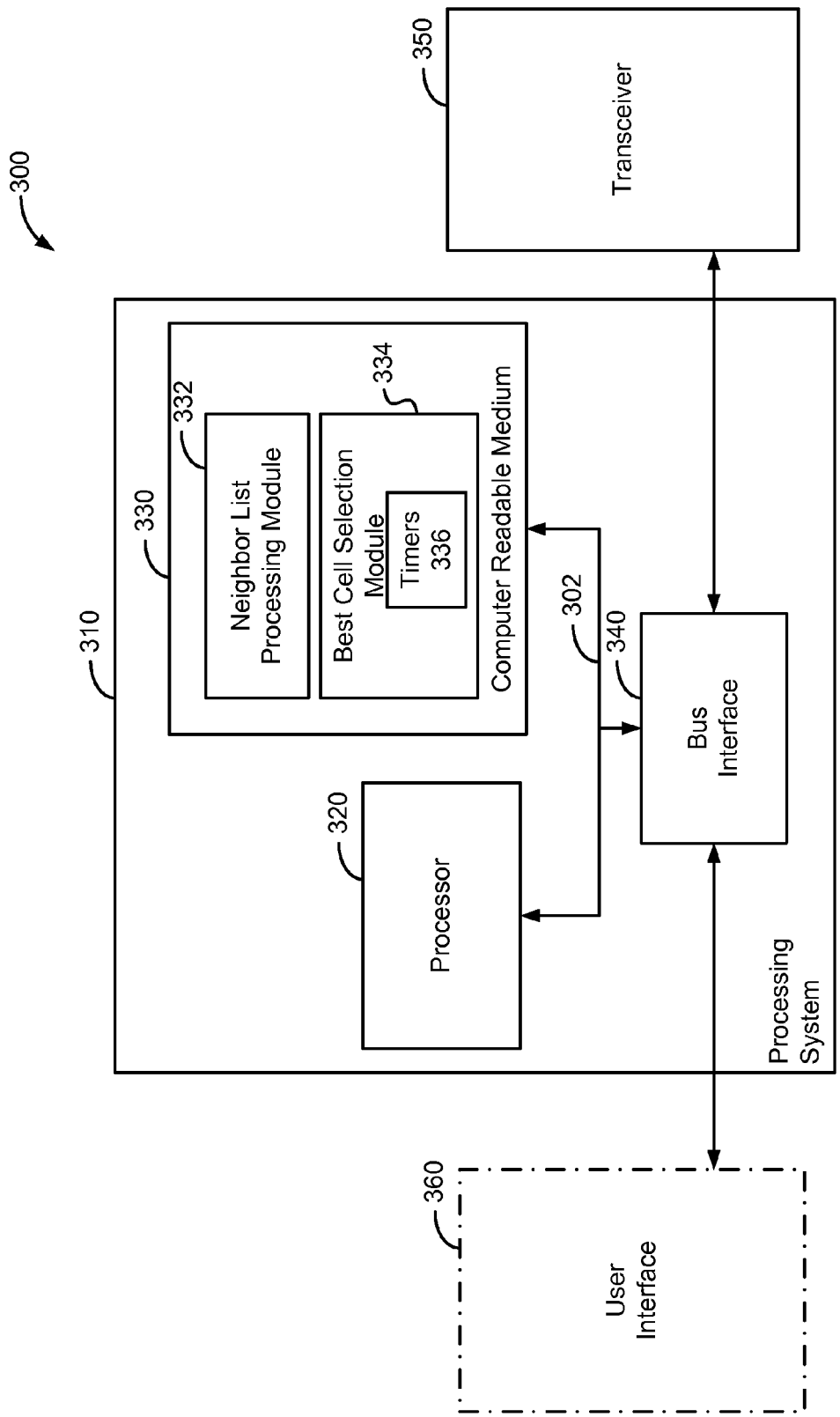
FIG. 3 is a conceptual block diagram of a hardware implementation of a user interface, in accordance with various described aspects.

FIG. 3 is a conceptual block diagram illustrating an example of a hardware implementation for a UE 300 employing a processing system 310. In this example, processing system 310 may be implemented with a bus architecture, represented generally by bus 302. The bus 302 may include any number of interconnecting buses and bridges depending on the specific application of the processing system 310 and the overall design constraints. The bus links together various circuits including one or more processors, represented generally by processor 320, and computer-readable media, represented generally by computer-readable medium 330. The bus 302 may also link various other circuits such as timing sources, peripherals, voltage regulators, power management circuits, and the link, which are well known in the art, and therefore, will not be described any further. A bus interface 340 provides an interface between the bus 302 and transceiver 350. The transceiver 350 provides a means for communicating with various other apparatus over a transmission medium. Depending upon the nature of UE 300, a user interface 360 (e.g., keypad, display, speaker, microphone, etc.) may also be provided.

The processor 320 is responsible for managing the bus and general processing, including the execution of software stored on the computer-readable medium 330. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The functions and methods described herein may be implemented by various modules in UE 300. As used herein, the term "modules" is intended to refer to hardware, firmware, a combination of hardware and software, software, or software in execution. By way of example, a module may be a process, an object, an executable, a thread of execution, a program, an application, a routine, a subroutine, a block of code or instructions, or any other software executed by the processor 320 or by another processing device. In this example, these modules may reside in the computer readable medium 330 which represents a single storage device, multiple storage devices, or other media. The software, when executed by the processor 320, causes the processing system 310 to perform various functions described herein. The computer-readable medium 330 may also be used for storing data that is manipulated by the processor 320 when executing software.

As depicted in FIG. 3, computer readable medium 330 may store a plurality of UE processing modules, including a neighbor list processing module 332 and a best cell selection module 334. It is noted that while two modules are depicted, the functionality of these two modules may be performed using multiple modules or sub-modules. Neighbor list processing module 332 may be configured to maintain one or more cells for soft handover. The neighbor list processing module 332 may maintain an active set, which may include a current best cell and a predefined number of additional cells which are monitored and which may become the best cell. Neighbor list processing module 332 may also maintain a monitored set so that additional cells other than those of the active set can be monitored. The combined number of cells in the active set and the monitored set may include, for example, up to 32 cells as specified by the 3GPP specifications.

Best cell selection module 334 may be configured to update the best cell as needed. Best cell selection module 334 may be configured to generate a plurality of timers 336 used to determine whether a best cell change should be performed. For example, best cell selection module 334 may be configured to generate one or more time-to-trigger (TTT) timers when a cell in the active set becomes stronger than the best cell. Timers may also be set to monitor those cells in the monitored set if a cell from the monitored set becomes stronger than any cell for which a TTT timer is already running According to some disclosed aspects, best cell module 334 may include a comparator component that receives signal strength information from a transceiver for one or more cells detected by the transceiver. The comparator component may be configured to compare the received signal strength values to a stored signal strength value corresponding to the signal from the best cell. In some instances, the comparator may be configured to determine whether a received signal strength value is stronger than that of the best cell by a predefined hysteresis value. The cell that becomes stronger may be known as the pending best cell. Best cell selection module 334 may also be configured to generate one or more timers which monitor the strength of a cell, other than the best cell, relative to another cell other than the best cell. For example, if a cell in the active set becomes stronger than the pending best cell, a timer may be generated to monitor this cell. Each timer may be set to monitor the cells for a predetermined hysteresis period to ensure that a cell that becomes strong remains strong. It is noted that the e1d triggering condition described herein or any other triggering condition may be used to determine whether a cell is stronger than another.

Best cell selection module 334 may also be configured to generate e1d measurement reports (MRM) and send these reports to the network. The e1d MRMs indicate to the network a change in the best cell. The reports may be sent upon expiration of a TTT timer. When e1d MRM is sent, TTT timers which are tracked relative to the best cell are canceled. Timers being monitored with respect to the pending best cell may be maintained, and a new e1d MRM may be sent upon expiration of one of these timers.

Figure 4:
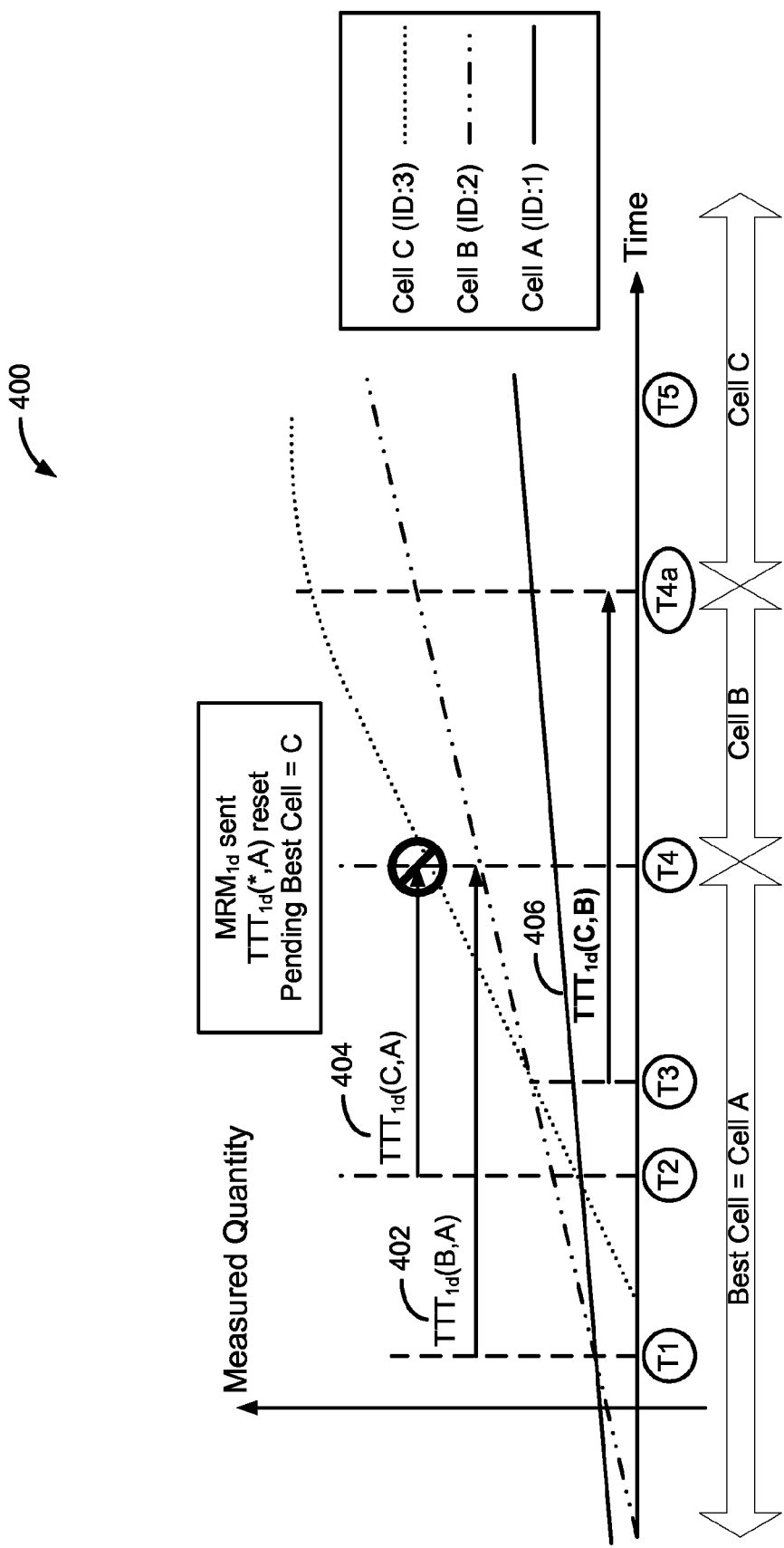
FIG. 4 depicts a timing diagram for an exemplary serving cell handling process, in accordance with various described aspects.

FIG. 4 depicts a timing diagram 400 in accordance with exemplary aspects described herein. In this example, Cell A is initially the best cell. At time T1, cell B becomes stronger than Cell A, and a first e1d timer 402, such as timer $TTT_1(B,A)$, is started. As used herein, the notation $TTT_{1d}(B,A)$ represents an event 1d TTT timer initiated based on a signal strength of cell B when cell A is set as the best cell. As such, cell B may be designated the pending best cell. At time T2, a second e1d timer 404, such as timer $TTT_{1d}(C,A)$, is started when Cell C becomes stronger than Cell A but weaker than Cell B. Thus, Cell B remains the pending best cell.

At time T3, Cell C becomes stronger than the pending best cell, Cell B. Accordingly, a third e1d timer 406, such as timer $TTT_{1d}(C,B)$, is started to track the amount of time Cell C remains strongest relative to Cell B. At time T4, timer $TTT_{1d}(B,A)$ expires and an e1d MRM for Cell B is sent to the network. As such, at this time, Cell B is set as the Best Cell. Further, all timers running with respect to Cell A are then canceled, while other timers may remain running. Thus, in this example, timers $TTT_{1d}(B,A)$ and $TTT_{1d}(C,A)$ are canceled, and timer $TTT_{1d}(C,B)$ continues to run as Cell C becomes the pending best cell. At time T4a, $TTT_{1d}(C,B)$ expires and an e1d MRM for Cell C is sent to the network to designate Cell C as the best cell. In accordance with this exemplary process, Cell C becomes the Best Cell at time T4a, which is earlier than T5 in the conventional process. In other words, the described exemplary aspects efficiently track new pending best cells by allowing the timers to be maintained in parallel.

As shown in FIG. 4, by having multiple timers, a full comparison of all cells can be made. Moreover, the situation depicted in FIG. 2, wherein a fast rising cell is delayed in becoming the best cell, is avoided. Here, because timer $TTT_{1d}(C,B)$ remains active after an e1d MRM for Cell B is sent, the delay in Cell C becoming the best cell is minimized. That is, Cell C does not have to wait an additional $TTT_{1d}$ timer period prior to become best cell because a timer is initiated when Cell C becomes stronger than the currently pending best cell, and the timer is not canceled when Cell B, the currently pending best cell, meets the requirements for becoming the best cell.

It is noted that in the example depicted in FIG. 4, the timer $TTT_{1d}(C,B)$ remains active until expiry because Cell C remains stronger than Cell B. If Cell C falls below Cell B before the expiry of the timer, then the timer is canceled. Moreover, if Cell B falls below the best cell (Cell A) before the timer $TTT_{1d}(B,A)$ expires, then Cell C becomes the pending best cell at that time, and all timers with respect to Cell B are canceled.

Figure 5:
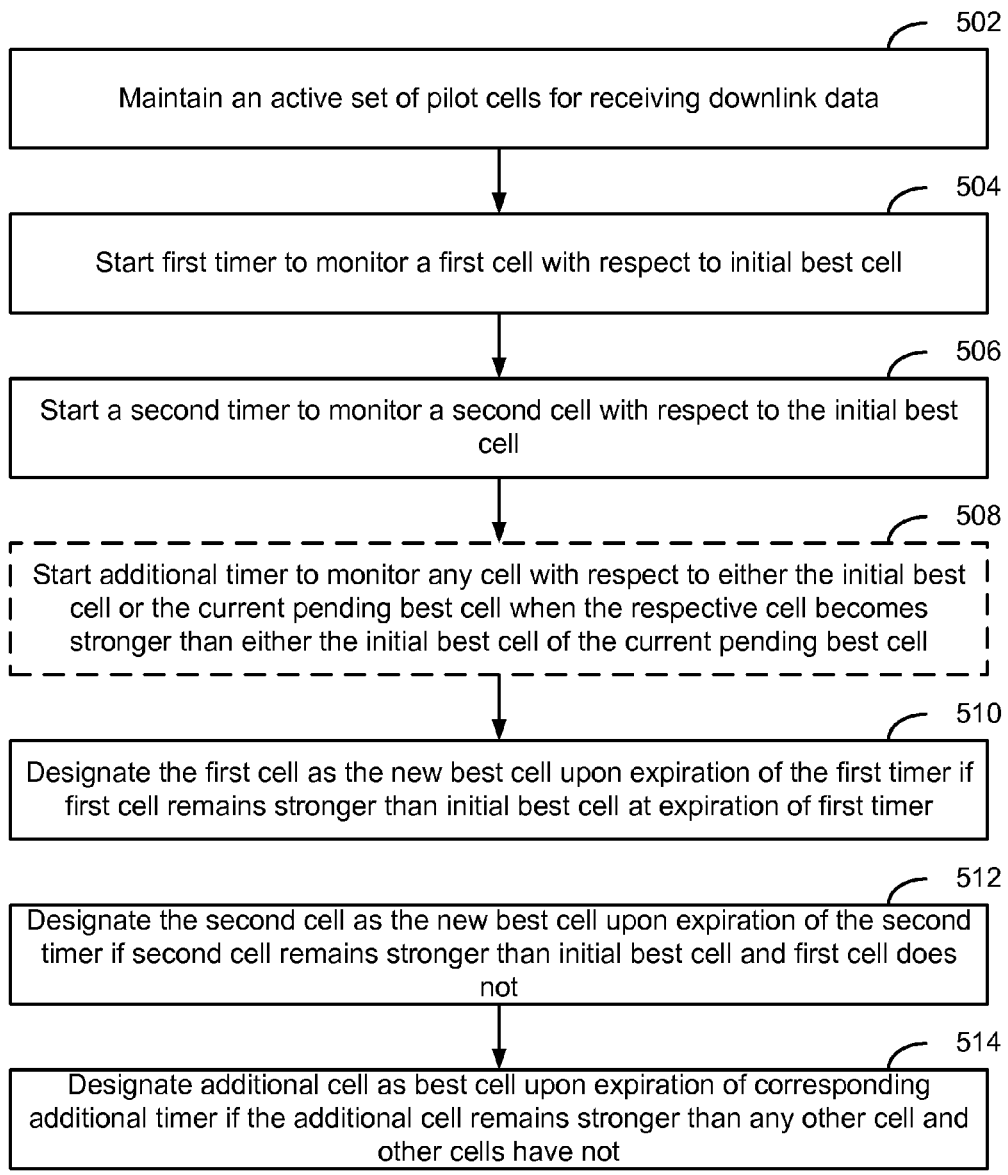
FIG. 5 is a flowchart depicting a serving cell handling process, in accordance with various disclosed aspects.

FIG. 5 is a flowchart depicting an exemplary method for managing serving cell changes. The method may be implemented, for example, by a UE. As depicting at 502, the UE may maintain an active set of pilot cells for receiving downlink data. The active set may include a serving cell and one or more other cells for which the UE has acquired a signal. The serving cell is the initial best cell based on one or more predefined criteria such as, for example, signal strength and/or quality. The UE may be configured to monitor signals received from each cell in its active set. Upon detection of a first cell that has become stronger than the initial best cell, the UE may start a first timer, as depicted at 504. The timer is used to ensure that the cell that becomes stronger remains stronger for a preconfigured amount of time.

A second cell may also become stronger than the initial best cell before the expiry of the first timer. Accordingly, as depicted at 506, a second timer may be started to monitor the second cell with respect to the initial best cell if it is determined that the second cell has become stronger than the initial best cell. An additional timer may be started to monitor any cell with respect to either the initial best cell or the current pending best cell when the respective cell becomes stronger than either the initial best cell or the current pending best cell, as depicted at 508.

Upon expiration of the first timer, the first cell may be designated as the new best cell, as depicted at 510. This indicates that the first cell has remained stronger than the initial best cell for the full timer period. Similarly, upon expiration of the second or any additional timers, the respective cells may be designated as the new best cell, as depicted at 512 and 514. For example, the second cell may be designated the new best cell if, upon expiration of the second timer, the second cell has remained stronger than the initial best cell and the first cell has not remained stronger than the initial best cell upon expiration of the first timer. In a similar manner, an additional cell that has become stronger than the second cell, which is the pending best cell, may become the best cell if upon the expiration of the respective timer, it has remained stronger than the pending best cell.

Figure 6:
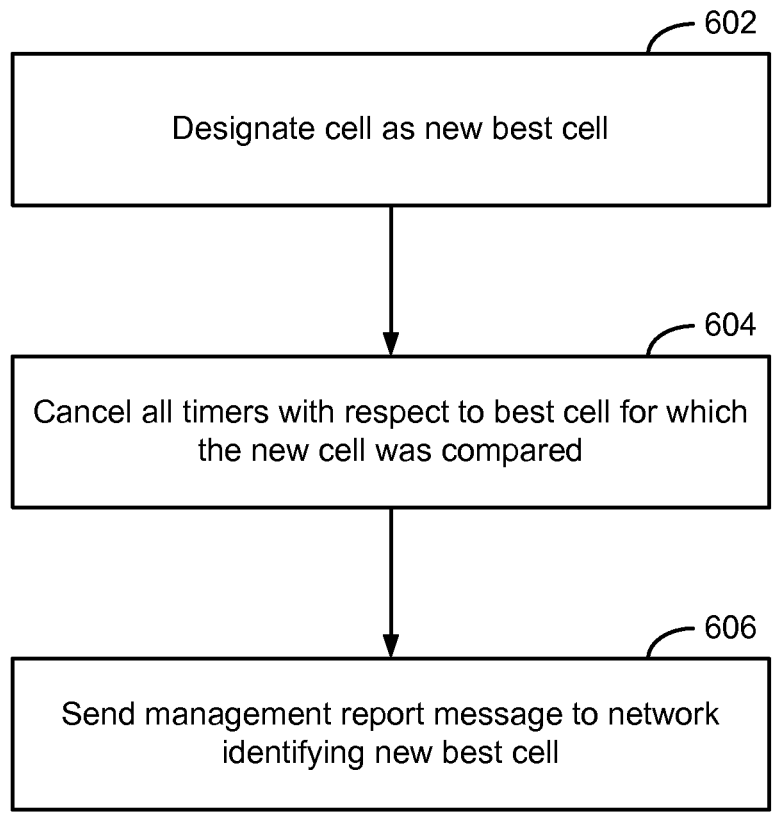
FIG. 6 is a flowchart depicting additional aspects of a serving cell handling process, in accordance with various disclosed aspects.

FIG. 6 is a flowchart depicting further details of a serving cell processing method. As depicted at 602, a cell may be designated the new best cell. For example, the first cell described with reference to FIG. 5 may be designated the new best cell upon expiration of the first timer, indicating that the first cell remained stronger than the initial best cell for the predefined timer period. Upon designating the first cell, for example, as the new best cell, all timers with respect to the first cell may be canceled, as depicted at 604. A management reporting message may then be transmitted to the network, as depicted at 606. The management reporting message informs the network of the newly elected best cell.

Figure 7:
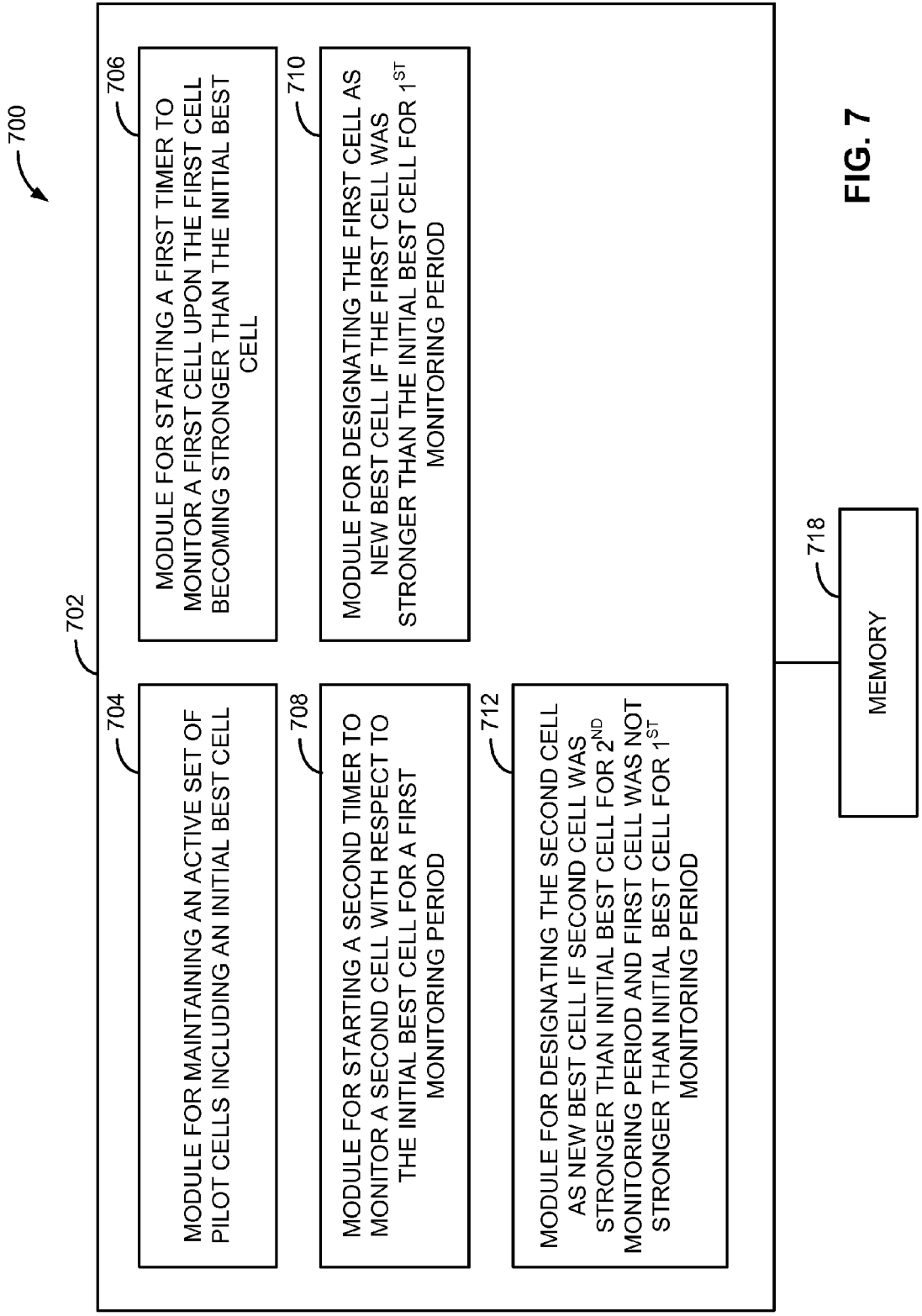
FIG. 7 depicts a system for managing serving cell changes, in accordance with various described aspects.

Turning to FIG. 7, illustrated is a system 700 for managing serving cell changes. As depicted, system 700 includes functional blocks that can represent functions implemented by a processor, software, or combination thereof (e.g., firmware). System 700 includes a logical grouping 702 of electrical components that act in conjunction. System 700 may be implemented, for example, by a UE.

Logical grouping 702 can include a module maintaining an active set of pilot cells for receiving downlink data, the active set comprising a plurality of cells for soft handover, wherein the plurality of cells comprises an initial best cell 704. Moreover, logical grouping 702 can include a module for starting a first timer to monitor a first cell from the active set of pilot cells upon the first cell becoming stronger than the initial best cell, wherein the first timer corresponds to a first monitoring period for the first cell to be stronger than the initial best cell 706. Logical group 702 may further include a module for starting a second timer to monitor a second cell with respect to the initial best cell upon the second cell becoming stronger than the initial best cell, wherein the second timer corresponds to a second monitoring period for the second cell to be stronger than the initial best cell 708; a module for upon expiration of the first timer, designating the first cell as a new best cell if the first cell was stronger than the initial best cell for the first monitoring period 710; and a module for upon expiration of the second timer, designating the second cell as the new best cell if the second cell was stronger than the initial best cell for the second monitoring period and the first cell was not stronger than the initial best cell for the first monitoring period 712. Additionally, system 700 can include a memory 718 that retains instructions for executing functions associated with electrical components 704-712. While shown as being external to memory 718, it is to be understood that electrical components 704-712 can exist within memory 718.

As used in this application, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, TD-SCDMA, and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing serving cell changes in a communications system having a single radio link for downlink data transmission, comprising:
   maintaining an active set of pilot cells for receiving downlink data, the active set comprising a plurality of cells for soft handover, wherein the plurality of cells comprises an initial best cell;
   starting a first timer to monitor a first cell from the active set of pilot cells upon the first cell becoming stronger than the initial best cell, wherein the first timer corresponds to a first monitoring period for the first cell to be stronger than the initial best cell;
   starting a second timer to monitor a second cell with respect to the initial best cell upon the second cell becoming stronger than the initial best cell, wherein the second timer corresponds to a second monitoring period for the second cell to be stronger than the initial best cell;
   upon expiration of the first timer, designating the first cell as a new best cell if the first cell was stronger than the initial best cell for the first monitoring period; and
   upon expiration of the second timer, designating the second cell as the new best cell if the second cell was stronger than the initial best cell for the second monitoring period and the first cell was not stronger than the initial best cell for the first monitoring period.

2. The method of claim 1, wherein the first cell is designated the new best cell, and wherein the method further comprises:
   canceling the second timer.

3. The method of claim 1, further comprising:
   starting a third timer to monitor the second cell with respect to the first cell upon detecting that the second cell has become stronger than the first cell, wherein the third timer corresponds to a third monitoring period for the second cell to be stronger than the first cell.

4. The method of claim 3, wherein the first cell is designated the new best cell, and wherein the method further comprises:
   canceling the first timer; and
   maintaining the third timer.

5. The method of claim 1, further comprising sending a first measurement reporting message to an access network identifying the first cell as the new best cell upon expiration of the first timer if the first cell was stronger than the initial best cell for the first monitoring period.

6. The method of claim 5, further comprising sending a second measurement reporting message to the access network identifying the second cell as the new best cell upon expiration of the second timer if the second cell was stronger than the first cell for the second monitoring period.

7. The method of claim 1, wherein expiration of the first timer occurs when a hysteresis condition is maintained for the first monitoring period.

8. The method of claim 1, wherein starting the first timer comprises determining that a predefined triggering condition has been satisfied.

9. The method of claim 8, wherein the predefined triggering condition is defined by one or more of the following parameters: a measurement result of the first cell, a cell individual offset associated with the first cell, a measurement result of the best cell, a cell individual offset associated with the best cell, and a hysteresis parameter.

10. At least one processor configured to manage serving cell changes in a communications system, comprising:
    a first module for maintaining an active set of pilot cells for receiving downlink data, the active set comprising a plurality of cells for soft handover, wherein the plurality of cells comprises an initial best cell;
    a second module for starting a first timer to monitor a first cell from the active set of pilot cells upon the first cell becoming stronger than the initial best cell, wherein the first timer corresponds to a first monitoring period for the first cell to be stronger than the initial best cell;
    a third module for starting a second timer to monitor a second cell with respect to the initial best cell upon the second cell becoming stronger than the initial best cell, wherein the second timer corresponds to a second monitoring period for the second cell to be stronger than the initial best cell;
    a fourth module for, upon expiration of the first timer, designating the first cell as a new best cell if the first cell was stronger than the initial best cell for the first monitoring period; and
    a fifth module for, upon expiration of the second timer, designating the second cell as the new best cell if the second cell was stronger than the initial best cell for the second monitoring period and the first cell was not stronger than the initial best cell for the first monitoring period.

11. A computer program product for execution by a computer, comprising:
    a computer-readable medium comprising:
    a first set of codes for causing a computer to maintaining an active set of pilot cells for receiving downlink data, the active set comprising a plurality of cells for soft handover, wherein the plurality of cells comprises an initial best cell;
    a second set of codes for causing the computer to start a first timer to monitor a first cell from the active set of pilot cells upon the first cell becoming stronger than the initial best cell, wherein the first timer corresponds to a first monitoring period for the first cell to be stronger than the initial best cell;
    a third set of codes for causing the computer to start a second timer to monitor a second cell with respect to the initial best cell upon the second cell becoming stronger than the initial best cell, wherein the second timer corresponds to a second monitoring period for the second cell to be stronger than the initial best cell;
    a fourth set of codes for causing the computer to, upon expiration of the first timer, designate the first cell as a new best cell if the first cell was stronger than the initial best cell for the first monitoring period; and
    a fifth set of codes for causing the computer to, upon expiration of the second timer, designate the second cell as the new best cell if the second cell was stronger than the initial best cell for the second monitoring period and the first cell was not stronger than the initial best cell for the first monitoring period.

12. An apparatus, comprising:
    means for maintaining an active set of pilot cells for receiving downlink data, the active set comprising a plurality of cells for soft handover, wherein the plurality of cells comprises an initial best cell;
    means for starting a first timer to monitor a first cell from the active set of pilot cells upon the first cell becoming stronger than the initial best cell, wherein the first timer corresponds to a first monitoring period for the first cell to be stronger than the initial best cell;

means for starting a second timer to monitor a second cell with respect to the initial best cell upon the second cell becoming stronger than the initial best cell, wherein the second timer corresponds to a second monitoring period for the second cell to be stronger than the initial best cell;

means for, upon expiration of the first timer, designating the first cell as a new best cell if the first cell was stronger than the initial best cell for the first monitoring period; and means for, upon expiration of the second timer, designating the second cell as the new best cell if the second cell was stronger than the initial best cell for the second monitoring period and the first cell was not stronger than the initial best cell for the first monitoring period.

13. The apparatus of claim 12, wherein the first cell is designated the new best cell, and wherein the apparatus further comprises:

means for canceling the second timer.

14. The apparatus of claim 12, further comprising:

means for starting a third timer to monitor the second cell with respect to the first cell upon detecting that the second cell has become stronger than the first cell, wherein the third timer corresponds to a third monitoring period for the second cell to be stronger than the first cell.

15. The apparatus of claim 14, wherein the first cell is designated the new best cell, and wherein the apparatus further comprises:

means for canceling the first timer; and
means for maintaining the third timer.

16. The apparatus of claim 12, wherein the means for designating the first cell as the new best cell comprises means for sending a first measurement reporting message to an access network designating the first cell as the new best cell upon expiration of the first timer if the first timer was stronger than the initial best cell for the first monitoring period.

17. The apparatus of claim 12, wherein the means designating the second cell as the new best cell comprises means for sending a second measurement reporting message to the access network designating the second cell as the new best cell upon expiration of the second timer if the second cell was stronger than the first cell for the second monitoring period.

18. The apparatus of claim 12, wherein expiration of the first timer occurs when a hysteresis condition is maintained for a predefined timer period.

19. The apparatus of claim 12, wherein the means for starting the first timer comprises means for determining that a predefined triggering condition has been satisfied.

20. The apparatus of claim 19, wherein the predefined triggering condition is defined by one or more of the following parameters: a measurement result of the first cell, a cell individual offset associated with the first cell, a measurement result of the best cell, a cell individual offset associated with the best cell, and a hysteresis parameter.

21. An apparatus, comprising:

an active set processing module configured to maintain an active set of pilot cells for receiving downlink data, the active set comprising an initial best cell a plurality of cells for soft handover; and a best cell selection module configured for:

starting a first timer to monitor a first cell from the active set of pilot cells upon the first cell becoming stronger than the initial best cell, wherein the first timer corresponds to a first monitoring period for the first cell to be stronger than the initial best cell;

starting a second timer to monitor a second cell with respect to the initial best cell upon the second cell becoming stronger than the initial best cell, wherein the second timer corresponds to a second monitoring period for the second cell to be stronger than the initial best cell;

upon expiration of the first timer, designating the first cell as a new best cell if the first cell was stronger than the initial best cell for the first monitoring period; and upon expiration of the second timer, designating the second cell as the new best cell if the second cell was stronger than the initial best cell for the second monitoring period and the first cell was not stronger than the initial best cell for the first monitoring period.

22. The apparatus of claim 21, wherein the first cell is designated the new best cell, and the best cell selection module is further configured for:

canceling the second timer.

23. The apparatus of claim 21, wherein the best cell selection module is further configured for:

starting a third timer to monitor the second cell with respect to the first cell upon detecting that the second cell has become stronger than the first cell, wherein the third timer corresponds to a third monitoring period for the second cell to be stronger than the first cell.

24. The apparatus of claim 23, wherein the first cell is designated the new best cell, and wherein the best cell selection module is further configured for:

canceling the first timer; and
maintaining the third timer.

25. The apparatus of claim 21, wherein designating the first cell as the new best cell comprises sending a first measurement reporting message to an access network designating the first cell as the new best cell upon expiration of the first timer if the first cell was stronger than the initial best cell for the first monitoring period.

26. The apparatus of claim 25, wherein designating the second cell as the new best cell comprises sending a second measurement reporting message to the access network designating the second cell as the new best cell upon expiration of the second timer if the second cell was stronger than the first cell for the second monitoring period.

27. The apparatus of claim 21, wherein expiration of the first timer occurs when a hysteresis condition is maintained for a predefined timer period.

28. The apparatus of claim 21, wherein starting the first timer comprises determining that a predefined triggering condition has been satisfied.

* * * * *